(12) United States Patent
Bae

(10) Patent No.: US 8,027,155 B2
(45) Date of Patent: Sep. 27, 2011

(54) COMPUTER ATTACHABLE TO AN UNDERSURFACE OF A DESK

(76) Inventor: Sung-Woo Bae, Seoul (KR)

( * ) Notice: Subject to any disclaimer, the term of this patent is extended or adjusted under 35 U.S.C. 154(b) by 231 days.

(21) Appl. No.: 12/194,004

(22) Filed: Aug. 19, 2008

(65) Prior Publication Data

US 2010/0014242 A1    Jan. 21, 2010

(30) Foreign Application Priority Data

Jul. 16, 2008  (KR) .................. 10-2008-0069049

(51) Int. Cl.
*G06F 1/16* (2006.01)

(52) U.S. Cl. ........... 361/679.02; 361/679.01; 361/679.6; 361/727; 312/223.3

(58) Field of Classification Search ............. 361/679.39, 361/727
See application file for complete search history.

(56) References Cited

U.S. PATENT DOCUMENTS

| | | | |
|---|---|---|---|
| 4,766,422 A * | 8/1988 | Wolters et al. ............ 312/198 |
| 5,587,877 A * | 12/1996 | Ryan et al. ............... 361/679.6 |
| 5,610,798 A * | 3/1997 | Lochridge ............... 361/679.6 |
| 5,611,608 A * | 3/1997 | Clausen ................. 312/223.3 |
| 5,825,615 A * | 10/1998 | Ohara ..................... 361/679.6 |
| 5,871,264 A * | 2/1999 | Ohara ..................... 312/334.7 |
| 5,897,178 A * | 4/1999 | Ohara ..................... 312/223.2 |
| 6,022,087 A * | 2/2000 | Gilbert ..................... 312/194 |
| 6,059,385 A * | 5/2000 | Guhl ....................... 312/223.2 |
| 6,115,240 A * | 9/2000 | Kaneko ................... 361/679.6 |
| 6,226,182 B1 * | 5/2001 | Maehara ................. 361/695 |
| 6,392,892 B1 * | 5/2002 | Sobolewski et al. ...... 361/724 |
| 6,574,100 B1 * | 6/2003 | Anderson ................ 361/679.5 |
| 6,590,151 B1 * | 7/2003 | Merk et al. .............. 174/365 |
| 6,626,686 B1 * | 9/2003 | D'Souza et al. .......... 439/131 |
| 6,965,516 B1 * | 11/2005 | Lin ......................... 361/727 |
| 7,254,010 B1 * | 8/2007 | Hardy ..................... 361/679.01 |
| 7,400,500 B2 * | 7/2008 | Ip et al. .................... 361/679.48 |
| 7,403,385 B2 * | 7/2008 | Boone et al. ............. 361/692 |
| 7,436,659 B2 * | 10/2008 | Diaz et al. ............... 361/679.48 |
| RE40,630 E * | 1/2009 | McEwan et al. ......... 454/184 |
| 2004/0012929 A1 * | 1/2004 | Chen ....................... 361/727 |
| 2007/0097624 A1 * | 5/2007 | Ip et al. .................... 361/687 |
| 2008/0080132 A1 * | 4/2008 | Kurosu et al. ........... 361/685 |

* cited by examiner

*Primary Examiner* — Jinhee Lee
*Assistant Examiner* — Anthony Q Edwards
(74) *Attorney, Agent, or Firm* — IPLA P.A.; Jame E. Bame

(57) ABSTRACT

A computer attachable to an undersurface of a desk is disclosed, in which an office space can be maximized by allowing a body part to horizontally slide into an undersurface of an upper board of a desk, and complicated electric wires can be arranged clean, and an office interior can be cleaned, and a compact size computer system can be obtained while using typical size computer elements, which lead to a cost competitive excellent quality computer system.

5 Claims, 9 Drawing Sheets

COMPUTER ATTACHABLE TO AN UNDERSURFACE OF A DESK

CROSS REFERENCE

This application claims foreign priority under Paris Convention and 35 U.S.C. §119 to Korean Patent Application No. 10-2008-0069049, filed Jul. 16, 2008 with the Korean Intellectual Property Office.

BACKGROUND OF THE INVENTION

The present invention relates to a computer which is a necessary item in an office, and in particular to a computer attachable to an undersurface of a desk in which an office space can be maximized by allowing a body part to horizontally slide into an undersurface of an upper board of a desk, and complicated electric wires can be arranged clean, and an office interior can be cleaned, and a compact size computer system can be obtained while using typical size computer elements, which lead to a cost competitive excellent quality computer system.

Generally, a computer has been widely used in home and office as an information and communication technology is advanced, and its application purpose and information process are diversified, while becoming a necessary item as an office instrument. Many researches and studies are conducted in view of their functions and designs.

The conventional computer is classified into a desktop computer placed on a desk, and a portable palm top computer. As shown in FIG. 1, the desktop computer 10 comprises a body part 15, a monitor 20, a keyboard 25 and a mouse 30. The body part 15 includes a casing which forms an outer frame, and a main board installed in the casing, a HDD(Hard Disk Drive) an ODD(Optical Disk Driver), and a power supply.

In the conventional computer 10, the casing of the body part 15 is generally made of a steel plate, and a heat radiation hole 17 is formed in one side of the same for radiating heat to the outside.

In the conventional computer 10, the size and volume of the body part 15 increases, and since the computer is mounted on a desk 40, it occupies a lot of desk space. The computer 10 might be mounted under the desk 40. In this case, it occupies a lower space of the desk 40, and a user feels inconvenience when he moves his legs, and when cleaning the office, it is needed to move out the computer.

In the conventional computer 10, a lot of electric wires 50 are connected to the body part. There is no way for storing and hiding the electric wires 50, so they are placed on the desk 40. The exposed electric wires 50 damage an office environment, and a complicated feeling is present. The office interior might look bad, and consequently work efficiency decreases.

The computer 10 is generally made slim and compact. The slim and compact size computer is composed of elements installed in the body part, and small elements such as a main board, a HDD, and a power supply. So, a manufacturing cost increases since a particular size product should be used. The above elements are not compatible to existing elements, which leads to a worse upgrade performance.

SUMMARY OF THE INVENTION

Accordingly, it is an object of the present invention to overcome the problems found in the conventional art.

It is another object of the present invention to provide a computer attachable to an undersurface of a desk in which an office space can be maximized by allowing a body part to horizontally slide into an undersurface of an upper board of a desk, and complicated electric wires can be arranged clean, and an office interior can be cleaned, and a compact size computer system can be obtained while using typical size computer elements, which lead to a cost competitive excellent quality computer system.

It is another object of the present invention to provide a computer attachable to an undersurface of a desk in which a slim computer can be obtained even when using typical size elements are used in a body part, and a price competitive excellent quality computer can be provided.

To achieve the above objects, in a computer including a body part, a monitor, a keyboard and a mouse, there is provided a computer attachable to an undersurface of a desk, comprising an engaging member which is protruded from an upper surface of a casing of the body part; and a mounting member which is fixed to an undersurface of the desk so that the engaging member slides and is inserted, wherein the body part is detachably engaged to an undersurface of the desk.

More preferably, the engaging member has a ㄱ-shape cross section as it is protruded in a row from both sides of a casing upper surface of the body part, and the mounting member includes a support plate fixed to an undersurface of the desk, and a guide rail having a ㄴ-shape cross section downwardly protruded while corresponding to the engaging member in a lower direction of the support plate, so the engaging members slide and are engaged along the guide rail.

More preferably, the mounting member has an arc shape bent part on a lower surface of the guide rail, and linearly contacts with the engaging member for thereby minimizing the friction.

More preferably, a plurality of pressurizing concave portions are formed along the guide rail having the arc bent part.

More preferably, the mounting member is hidden in a space formed between the desk and the drawer of the undersurface of the desk, and the body part is hidden between the desk and the drawer.

More preferably, the body part is equipped with a main heating radiation hole in a casing lower surface, and a cooling fan and a main board are downwardly mounted in the interior of the same, and the cooling fan blows towards the main heat radiating hole of the casing lower surface for thereby blowing toward the main board based on a downward blowing method.

More preferably, in the body part, an ODD is upwardly engaged in the interior of the casing as compared to the cooling fan and the main board which are downwardly engaged.

More preferably, in the body part, a heat radiation hole is formed in a lower surface, both sides, and front and rear sides of the casing, respectively, for thereby heat-radiating the interior.

In the present invention, a computer might be removed from an upper side of a desk, so a space application is maximized in an office space. Complicated electric wires used for a computer are cleaned, and a good office interior can be obtained.

In the present invention, an engaging member installed on an upper surface of a body part is slide-engaged along a guide rail of a mounting member fixed on an undersurface of a desk, so a computer can be easily attached to or detached from an undersurface of a desk for thereby obtaining a convenient use.

In the present invention, a mounting member forms a circular bent part on a lower surface of a guide rail, so a linear contact is obtained when sliding along with an engaging member for thereby minimizing a friction. So, an engaging member can be easily inserted into a mounting member, and a computer can be easily attached to or detached from a desk. When a computer is separated from a desk after a long time use, a separation is easy.

In the present invention, a body part fixed on an undersurface of a desk is stored in a space between a desk and a drawer, so a dead space of a desk can be effectively used. So, a computer can be easily accommodated in an enough space of a desk, which leads to maximizing an office space while obtaining an excellent space application. Since electric wires connected to a backside of a computer are hidden in an inner lower side of a desk, so an office space looks clean.

In the present invention, a heat radiation hole is formed in a lower side surface of a casing of a body unit, and a cooling fan and a main board are downwardly mounted in the interior of the same. The cooling fan blows in a direction of a main heat radiation hole of the lower side of the casing, so the main board can be heat-radiated based on a downward blowing type. The body part can be closely contacted with an undersurface of a desk while obtaining an efficient heat radiation operation of a computer element and maintaining an excellent computer performance.

In the present invention, an ODD is mounted in the interior of the casing of the body part in the direction opposite to the downward mounting direction of the cooling fan and the main board, the ODD can be more easily used. Namely, the cooling fan and the main board are downwardly mounted in the interior of the casing, but the ODD is mounted in the upward direction, normal direction, so a user can easily use like a typical desktop computer, which leads to a much easier use.

In the present invention, the body part is equipped with a plurality of heat radiation holes in a lower surface, both sides, and front and back sides of the casing for more efficiently radiating heat, so a heat radiation can be performed through all sides of the casing, whereby a heat radiation effect of inner elements is excellent, and consequently it is not needed to mount a casing cooling fan for thereby obtaining a low noise and power consumption.

In the present invention, since heat radiation holes are formed in all sides for more efficiently radiating heat, the elements can be more freely installed in the casing, so a slim and compact size computer can be obtained even using typical elements such as a main board, a HDD and a power supply, and a slim computer structure having an excellent quality can be manufactured in comparison to its price.

BRIEF DESCRIPTION OF DRAWINGS

FIGS. 4A and 4B are views illustrating a mounting member provided in a computer attachable to an undersurface of a desk according to the present invention, of which FIG. 4A is a plane view, and FIG. 4B is a cross sectional view.

DETAILED DESCRIPTION OF THE INVENTION

In a computer including a body part, a monitor, a keyboard and a mouse, there is provided a computer attachable to an undersurface of a desk, comprising an engaging member which is protruded from an upper surface of a casing of the body part; and a mounting member which is fixed to an undersurface of the desk so that the engaging member slides and is inserted, wherein the body part is detachably engaged to an undersurface of the desk.

The preferred embodiments of the present invention will be described with reference to the accompanying drawings.

Figure 1:
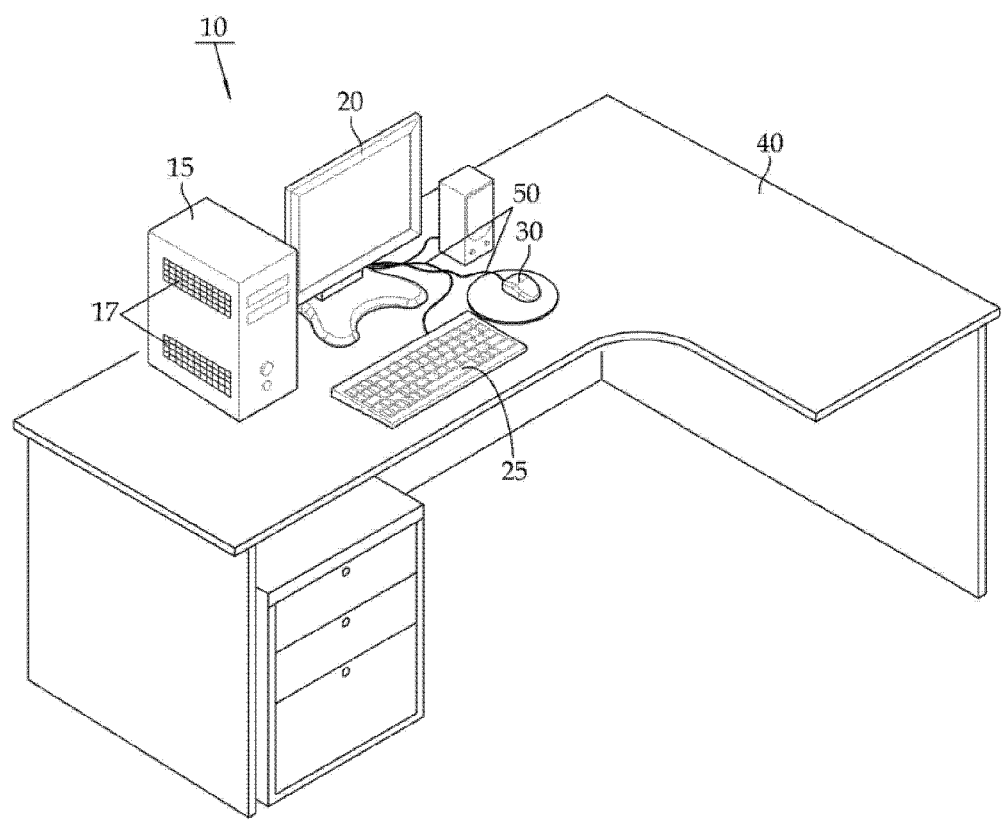
FIG. 1 is a perspective view illustrating a state that a conventional computer is mounted on a desk.
Figure 2:
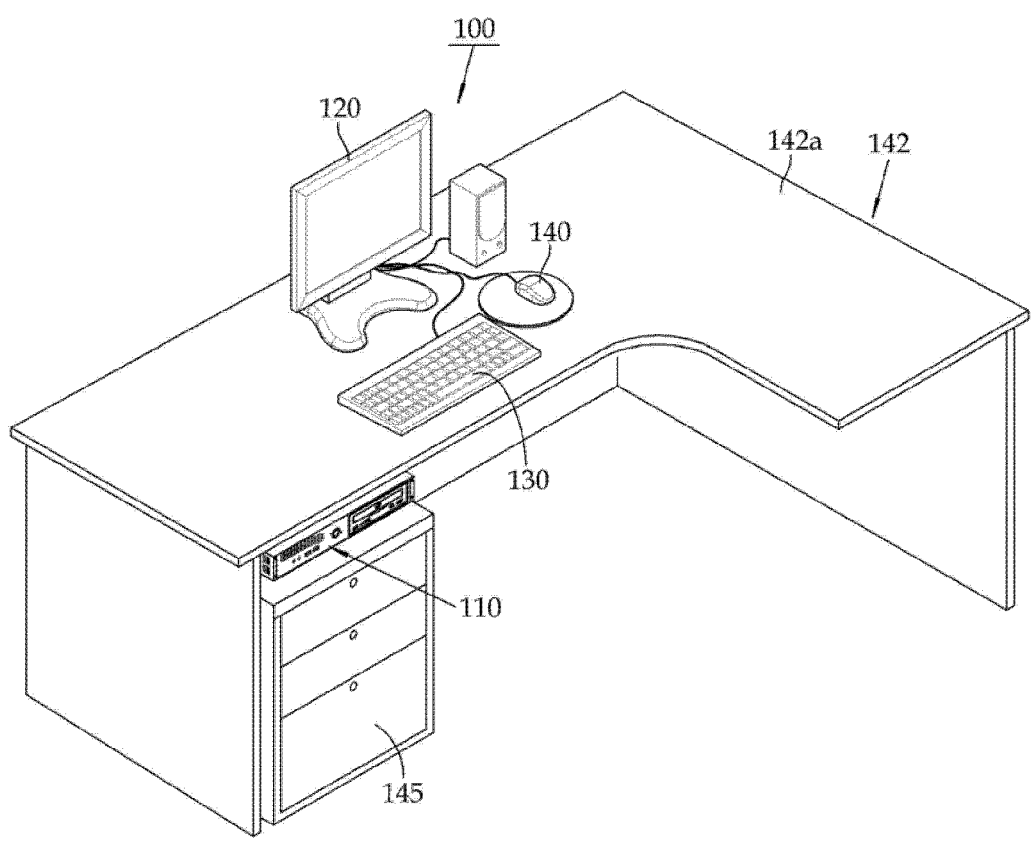
FIG. 2 is a perspective view illustrating a state that a body part of a computer attachable to an undersurface of a desk is mounted under a desk according to the present invention.

A computer 100 attachable to an undersurface of a desk according to the present invention comprises a body part 110, a monitor 120, a keyboard 130 and a mouse 140. As shown in FIG. 2, the body part 110 is attachable to an undersurface of an upper board 142a of the desk 142.

Figure 3:
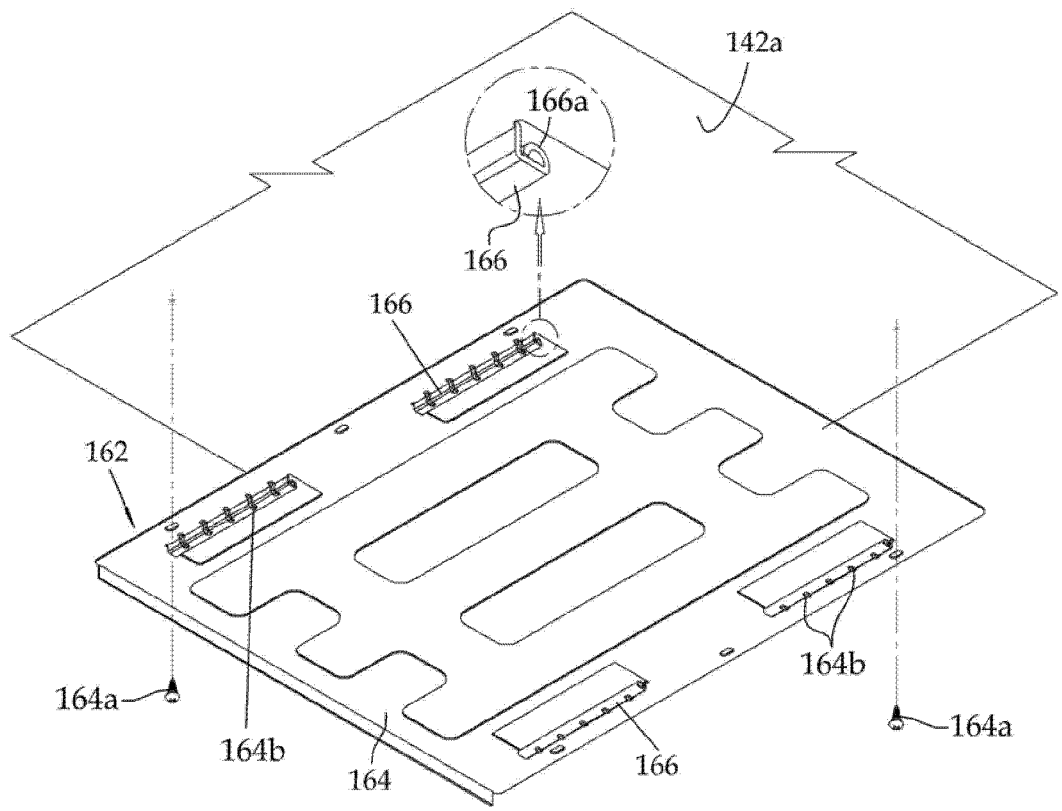
FIG. 3 is a disassembled perspective view illustrating an engaging member and a mounting member provided in a computer attachable to an undersurface of a desk according to the present invention.
Figure 3:
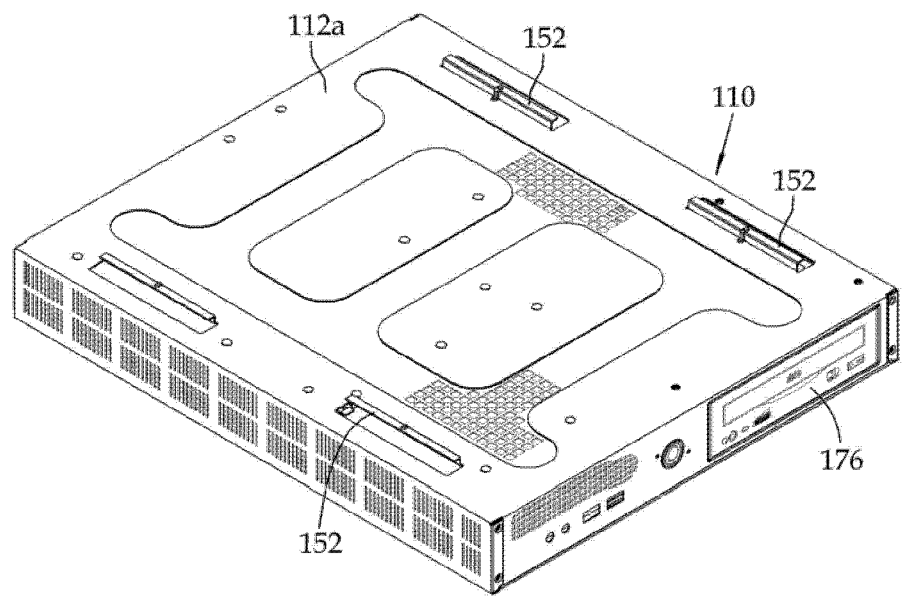

As shown in FIG. 3, the computer 100 attachable to an undersurface of a desk according to the present invention is equipped with an engaging member 152 provided on a casing upper surface 112a of the body part 110 having a main board, a HDD, an ODD and a power supply. The engaging member 152 is formed in a ⌐⌐-shape as being protruded in a row at both sides of the casing upper surface of the body part 110.

The ⌐⌐-shaped engaging members 152 are arranged along both sides of the casing upper surface 112a while being opposite to one another, and are arranged in a row from the front side to the rear side.

Figure 4A:
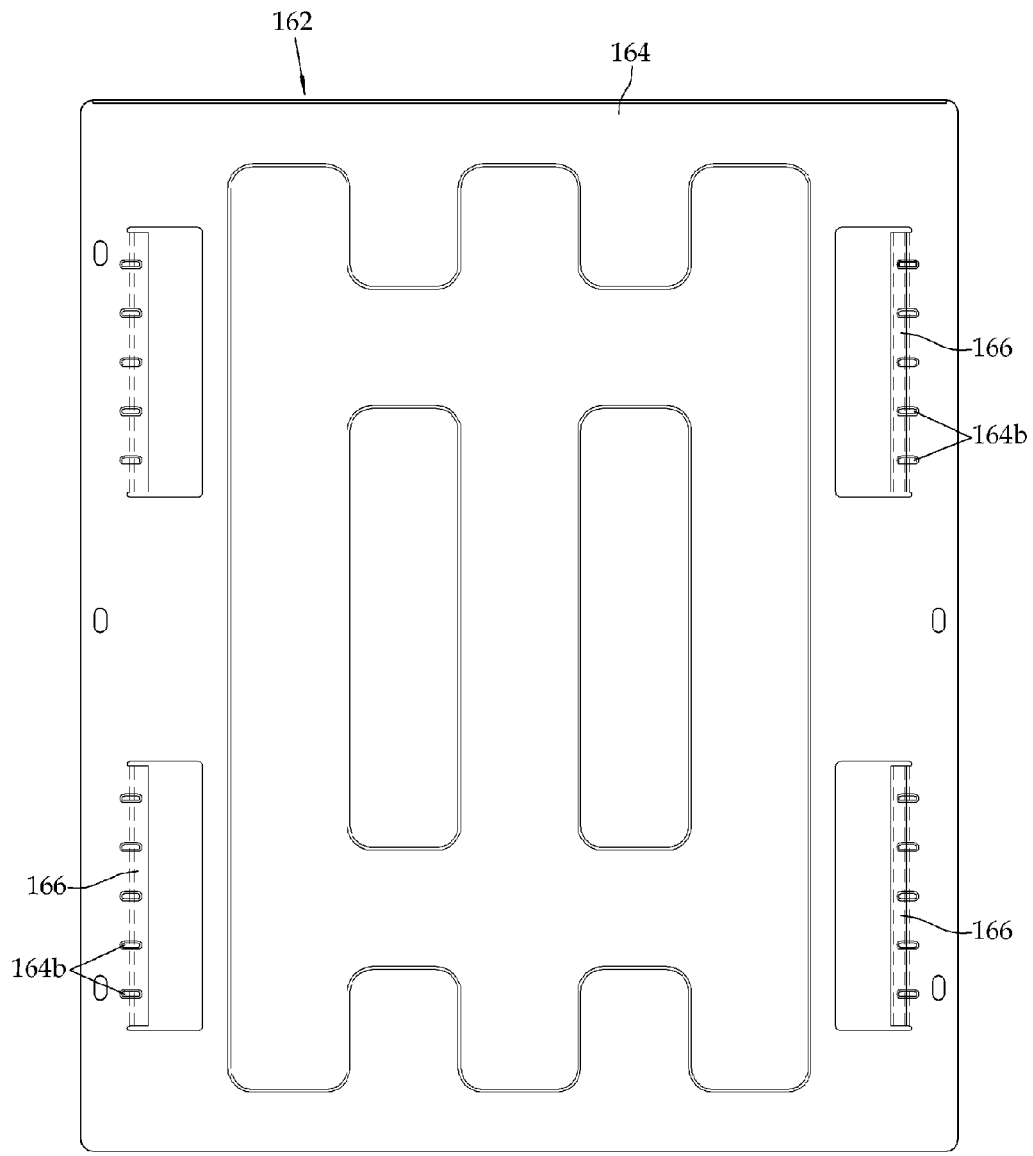
Figure 4B:
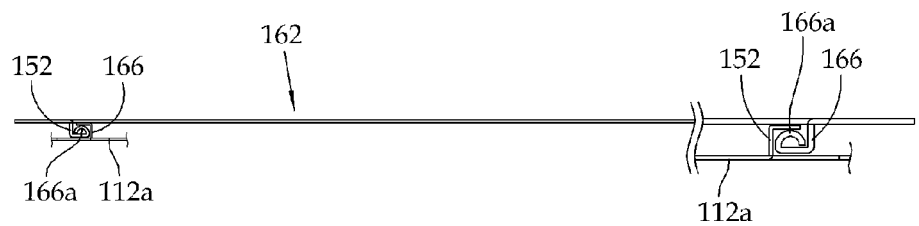

The casing upper surface 112a is slide-engaged to the mounting member 162 fixed on an undersurface of the upper board 142a of the desk 142. As shown in FIGS. 3 and 4A and 4B, the mounting member 162 is equipped with a support plate 164 fixed on an under surface of the upper board 142a of the desk 142. The support plate 164 might be integrally fixed to an undersurface of the upper board 142a of the desk 142 using a plurality of screws 164a. The mounting member 162 is fixed to a glass or steel desk by using a pair of attachable or detachable members(for example, 3M dual lock or something) which are engaged to each other. In this case, one attachable or detachable member is attached to an undersurface of the glass or steel upper board by using an adhesive, and the remaining one attachable or detachable member is attached to an upper surface of the support plate 164 of the mounting member 162 while being opposite to each other.

Consequently, the mounting member 162 can be fixed on an undersurface of the upper board of the desk.

In addition, when the mounting member 162 is fixed to an undersurface of the desk, the mounting member 162 is first attached to an undersurface of the desk by using a double-side tape for an easier work, and it is second fixed to the same by using an engaging member such as a screw. When the mounting member 162 is fixed to an undersurface of the desk, it is needed to engage the mounting member 162 to an undersurface of the desk with one hand while the other hand supports the mounting member. So, it is not east for only one worker to fix it. Here, a foam type double-side tape is capable of absorbing vibrations which might be transferred to the desk due to a fan operation of a computer body.

A guide rail 166 having a ⌐-shape cross section and being downwardly protruded to correspond to the ⌐-shape engaging member 152 is fixed to a lower side of the support plate 164. The guide rail 166 allows the engaging members 152 to be inserted into the same and to be slide-engaged.

The support plate 164 maintains a constant distance between the ⌐-shape guide rail 166. When the computer body part 110 is hanged by means of the guide rail 166, and the load is applied thereto, a certain transformation of the guide rail 166 is prevented. When the load of the computer body 110 is transferred from the guide rails 166, the support plate 164 distributes the load to the whole portions of the support plate for thereby effectively preventing any transformation of the guide rail 166, and the guide rail 166 is fixed to an undersurface of the upper board 142a of the desk.

As an arc shaped bent party 166a is formed on a lower surface of the ⌐-shape guide rail 166, a friction is minimized as the mounting member 162 linearly contacts with the ⌐-shape engaging member 152 when slide-engaging with the same. In the above structure, a lower surface of the guide rail 166 is rolled upward with a semi-circular bent part 166a and is upwardly protruded, so it linearly contacts with the engaging member 152 inserted into the guide rail 166. In this case, a plurality of pressurizing concave grooves 164b are formed along the ⌐-shape guide rail 166 in which the arch shape bent part 166a is formed, so the support plate 164 and the guide rail 166 are not twisted in left or right direction or are not sagged even when they are used for a long time for thereby preventing any transformation, so a stable sliding operation is obtained, and durability is enhanced.

When the engaging member 152 is engaged to the mounting member 162, it can be easily slide-engaged with the help of a linear contact, and the body part 110 can be easily attached to or detached from the same. When the computer is separated from the desk after a long time use, the engaging member 152 can be easily separated from the guide rail 166, so it is easy to use.

In the present invention, the mounting member 162 is fixed to an undersurface of the upper board 142a in a space between the desk 142 and the drawer 145 of its lower side. In this case, the body part 110 is stored between the desk 142 and the drawer 145.

As shown in FIG. 2, the body part 110 has the width and depth smaller than the plane side of the drawer 145. In this structure, the body part 110 is not protruded from the space between the desk 142 and the drawer 145 but is positioned within the space. For example, the body part 110 has a height 53 mm×a width 360 mm×a depth 425 mm, so it can be positioned within the space between the desk 142 and the drawer 145.

With the above structure, it is possible to easily position within a space formed near the desk 142, a dead space of the desk 142 can be effectively used. Since the whole space of the desk 142 can be used, an office space might be maximized, and a space application efficiency is maximized. The electric wires connected to the rear side of the body part 110 are hidden in an inner lower side of the desk 142, so the office space might look arranged and clean.

When the computer of the present invention is installed in a space such as an internet caf?where many persons visit, the body or elements might be robbed. In this case, a certain locking device is needed, so a visiting person cannot freely unlock the body part 110 which is engaged to the mounting member 162. Here, the locking device 110 includes all kinds of locking devices which are capable of locking the body part 110 and the mounting member 162.

Figure 5:
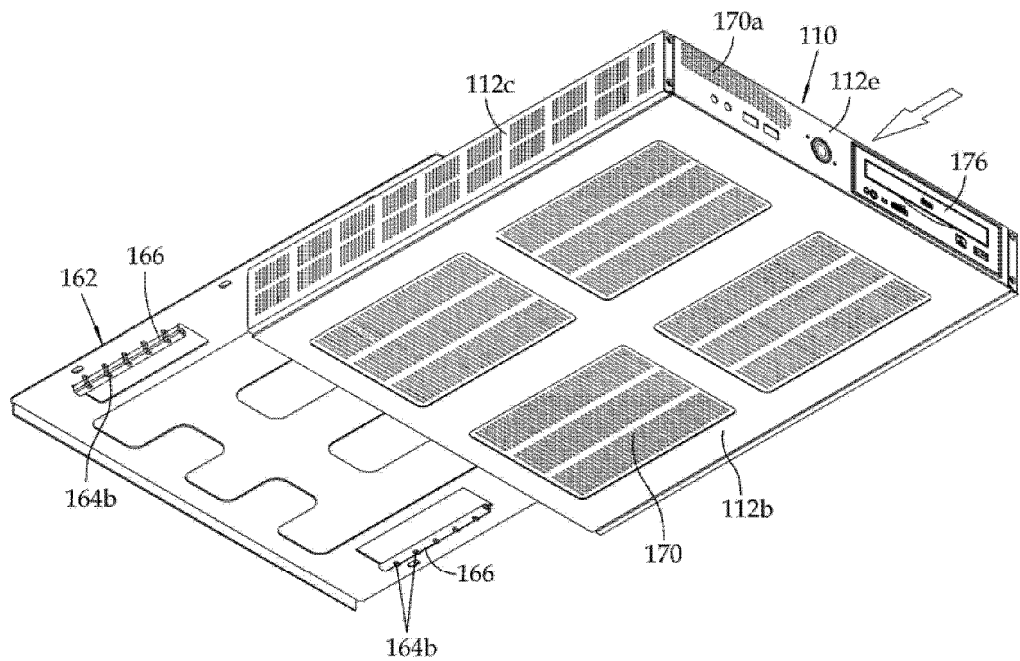
FIG. 5 is a perspective view illustrating a state that a body part provided in a computer attachable to an undersurface of a desk is engaged to a mounting member according to the present invention.
Figure 6:
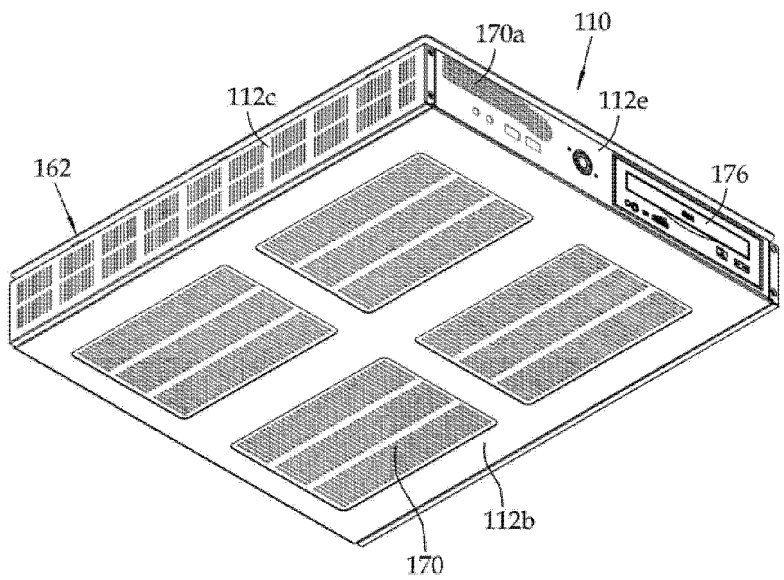
FIG. 6 is a perspective view illustrating a lower surface of a casing provided in a computer attachable to an undersurface of a desk according to the present invention.
Figure 7:
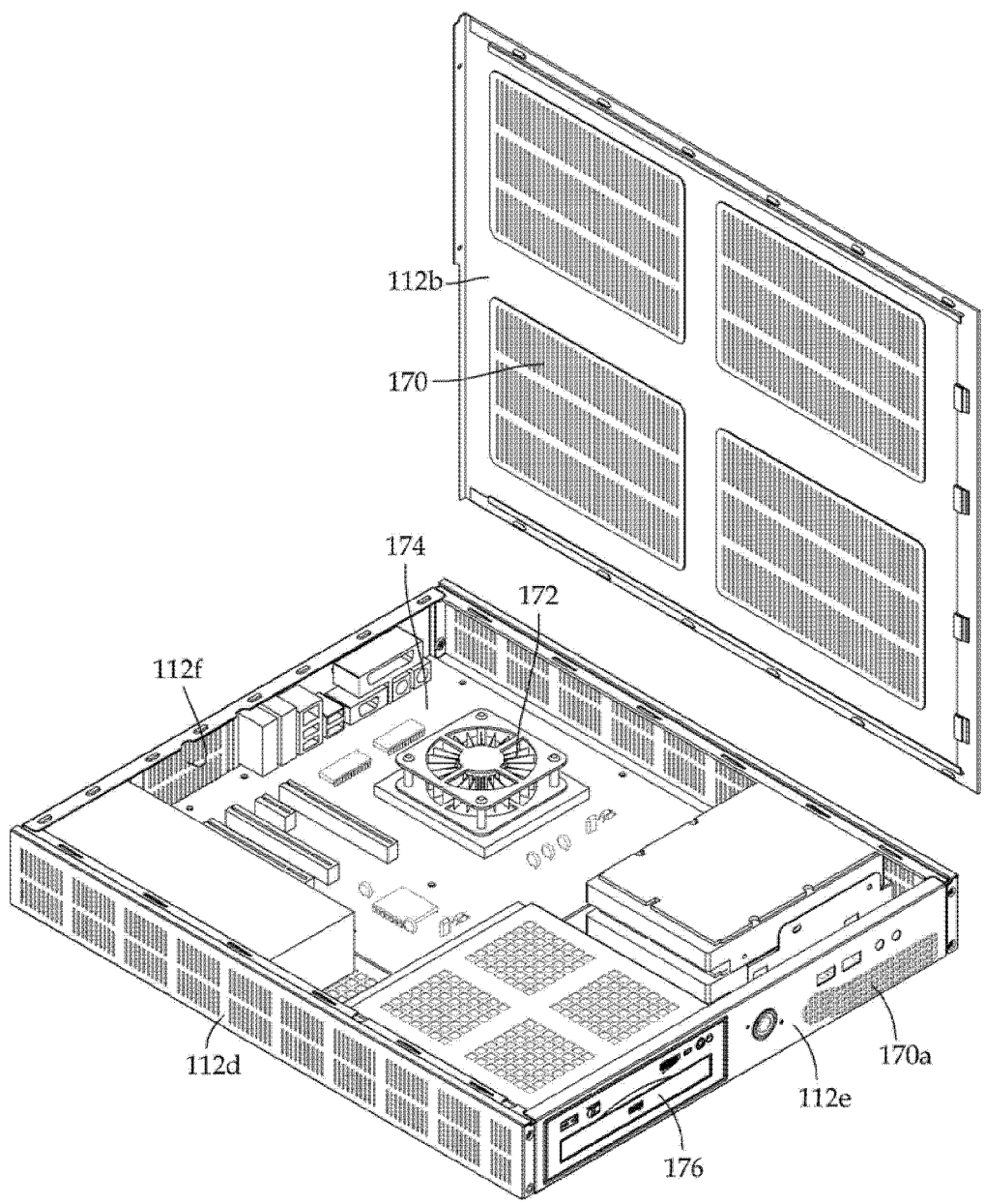
FIG. 7 is a disassembled perspective view illustrating an element arrangement structure of a body provided in a computer attachable to an undersurface of a desk according to the present invention in which a cooling fan and a main board are arranged in a downward direction, namely, an upside down shape, and an ODD is arranged in an upward direction.
Figure 8:
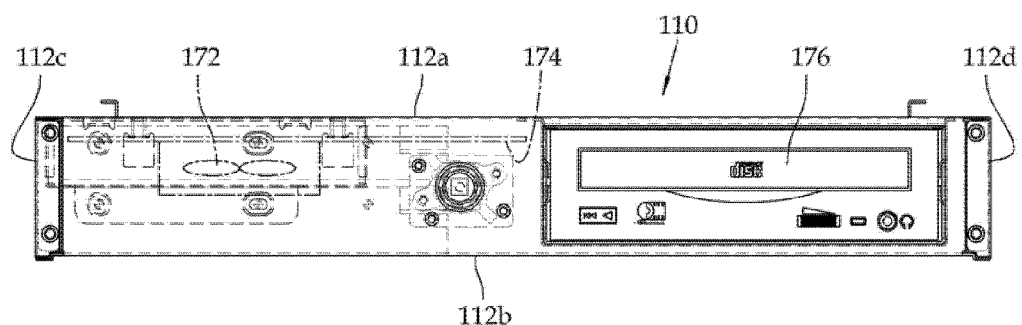
FIG. 8 is a partially cut-away cross sectional view illustrating an element arrangement structure of a body provided in a computer attachable to an undersurface of a desk according to the present invention, in which a cooling fan and a main board are arranged in a downward direction, namely, an upside down shape, and an ODD is arranged in an upward direction.
Figure 9A:
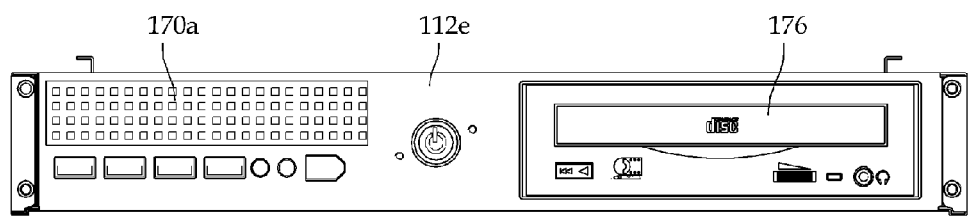
FIGS. 9A, 9B, 9C and 9D are front views illustrating the front sides of various casings provided in a computer attachable to an undersurface of a desk according to the present invention.
Figure 9B:
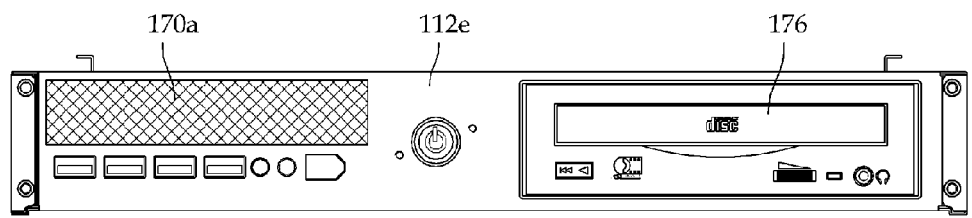
Figure 9C:
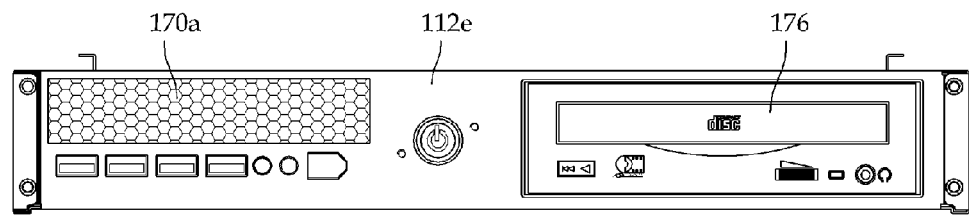
Figure 9D:
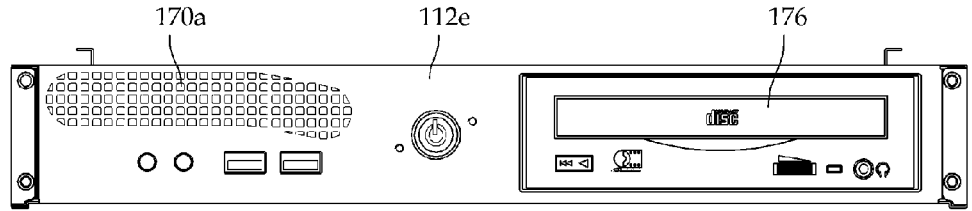

As shown in FIGS. 5 and 6, the computer 100 attachable to an undersurface of the desk, the body part 110 forms a heat radiation hole 170 in the casing lower surface 112b. As shown in FIGS. 7 and 8, the cooling fan 172 and the main board 174 are disposed in the interior of the body part 110 in a downward direction of the main heat radiation hole 170 of the casing lower surface 112b.

Since the main heat radiation hole is formed in an upper surface of the casing, the conventional cooling fan and main board are engaged in the interior of the casing in an upward direction. In the present invention, on the contrary, the cooling fan 172 and the main board 174 are downwardly fixed in the interior of the casing.

The cooling fan 172 and the main board 174 are fixed in the interior of the casing in a downward direction and blows toward the main heat radiation hole 170 formed in the casing lower surface 112b when the cooling fan 172 operates and heat-radiates the neighboring main board 174 based on a downward blowing method. In this structure, when the computer body part 110 is closely contacted with the undersurface of the upper board 142a of the desk in the space between the desk 142 and the drawer 145, a reliable cooling operation of the cooling fan 172 cannot be obtained when the main heat radiation hole 170 is formed in the casing upper surface 112a like in the conventional art.

However, in the present invention, even when the body part 110 is closely contacted with an undersurface of the upper board 142a of the desk 142, the cooling fan 172 blows in the lower direction, so the computer elements can be reliably heat-radiated, which leads to an excellent performance of the computer.

In the present invention, in the body part 110, the ODD 176 is engaged in the direction opposite to the downward engaging direction of the cooling fan 172 and the main board 174 in the interior. As shown in FIGS. 7 and 8, when the cooling fan 172 and the main board 174 are downwardly arranged toward the main heat radiation hole 170 of the casing lower surface 112b, the ODD 176 is upwardly engaged, and the user can conveniently use the ODD 176 along with the above arrangement of the ODD.

The body part 110 is formed in a structure for heat-radiating by forming the heat radiation hole 170a in the lower surface 112b, both sides 112c and 112d and front and reach sides 112e and 112f except for the upper surface 112a of the casing. The above heat-radiation structure is shown in FIGS. 9A, 9B, 9C, 9D and 10A, 10B and 11. In the above structure, the heat radiation is performed through all sides except for the casing upper surface 112a.

Figure 10A:
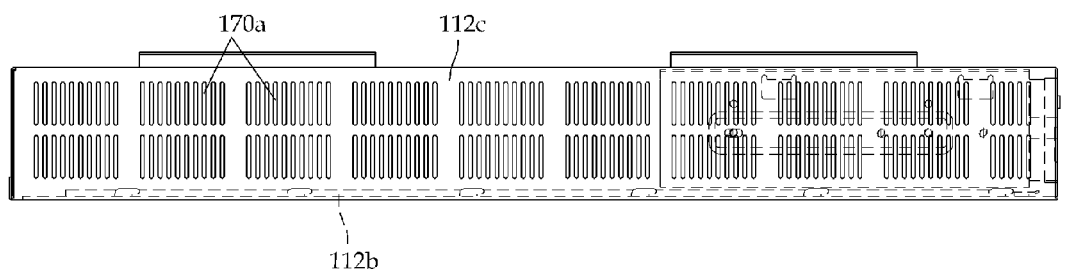
FIGS. 10A and 10B are front views illustrating both sides of a casing provided in a computer attachable to an undersurface of a desk according to the present invention.
Figure 10B:
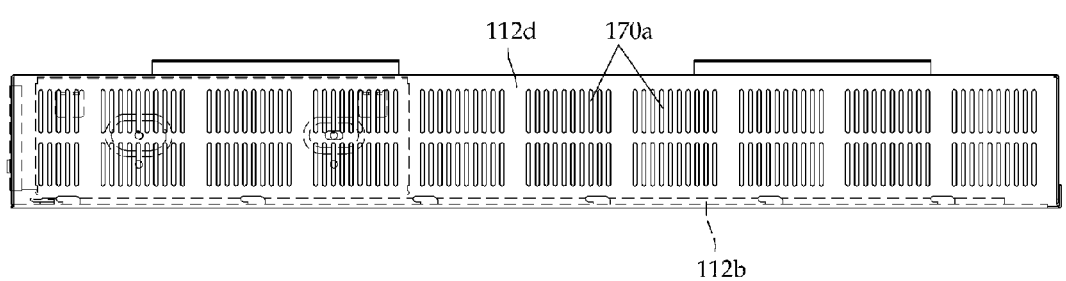
Figure 11:
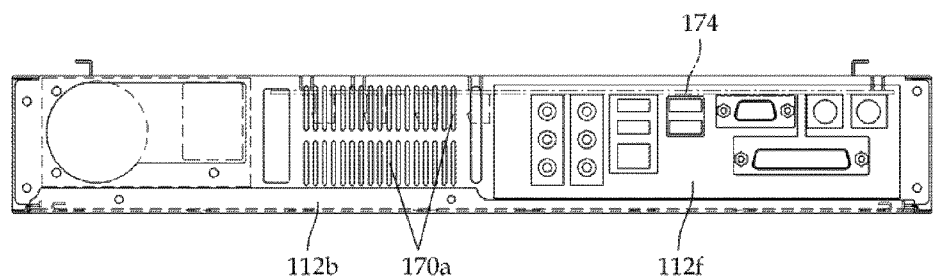
FIG. 11 is a front view illustrating a backside of a casing provided in a computer attachable to an undersurface of a desk according to the present invention.

As shown in FIGS. 9A, 9B, 9C and 9D, a plurality of heat radiation holes 170a might be further formed in the casing front side 112e. The heat radiation hole 170a might be punch-formed in a mesh shape processed in a shape of a rectangular hole or a honeycomb hole. As shown in FIG. 7, the main heat radiation hole 170 formed of a plurality of punched holes is formed in the casing lower surface 112b. As shown in FIGS. 10A and 10B, a plurality of slit shaped heat radiation holes 170a are formed in the casing both sides 112c and 112d. As shown in FIG. 11, a plurality of slit heat radiation holes 170a are formed in the casing rear side 112f.

In the present invention, since it is possible to heat-radiate through the whole surfaces except for the casing upper surface 112a with the help of the above heat-radiating structure, it is possible to efficiently arrange the elements in the casing, so it is possible to make the body part 110 slim even when a typical size of main board, HDD and power supply is used. In the conventional art, the unit cost of the element increased, but in the present invention, since a typical element is used in the interior of the body, a price increase is prevented, and consequently a price competitive excellent quality slim computer might be manufactured.

In the computer 100 attachable to an undersurface of a desk according to the present invention, the body part 110 equipped with the main board, the HDD, the ODD and the power supply is fixed to an undersurface of the upper board 142a of the office desk, and the monitor 120 and the keyboard 130 and the mouse 140 are arranged on the desk 142, so it is possible to maximize the space of the desk 142.

When the body 110 is fixed to an undersurface of the upper board 142a of the desk, the mounting member 162 is fixed to the undersurface of the upper board 142a of the desk using a screw 164a or an attaching or detaching member. The fixing position may be various portions on the desk 42, and preferably, it is a portion between the desk 142 and the drawer 145.

When it slides through the engaging member 152 engaged on the upper surface of the body part 110 in the mounting member, the body part 110 is inserted into the undersurface of the desk 142 in a drawer type, and it is fixed to the undersurface of the desk 142.

In this case, since the body part 110 is formed smaller than the plane size of the drawer 142, it is fixed to an undersurface of the upper board 142a of the desk on the upper side of the drawer 145, it is not extruded to the outside, and various electric wires such as LAN cable, power cables and connection cables connected to the rear side of the body part 110 are hidden in the interior of the desk 142, so the surrounding portions of the desk look clean.

The cooling fan 172 and the main board 174 are arranged upside down in the interior of the body part 110, and the ODD 176 is arranged upwards, and the cooling fan 172 heat-radiates the heating elements of the computer including the main board 174 in the downward blowing method. So, an excellent performance of the computer is obtained, and since the ODD 176 is normally arranged, a user can easily use the same.

The elements can be efficiently arranged in the body part 110, so it is possible to make the computer slim even when a typical size of main board, HDD, ODD and power supply is used.

In the present invention, the body part 110 of the computer and the electric wires 50 connected to the same are removed from the upper surface of the desk 142, and the computer horizontally slides into the undersurface of the upper board 142a of the desk, and the complicated things of the desk 142 look clean and arranged, so it is possible to improve the office environment and interior.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims. For example, it is possible to add or change various elements provided in the interior of the body part in order to improve the performance of the computer, and it is possible to change the types of holes or sizes of the heat radiating holes formed in the whole surfaces of the casing in order to enhance a heat radiation. It is obvious that ant modification or design changes of the embodiments are included in the scope of the claim of the present invention.

In the present invention, a computer might be removed from an upper side of a desk, so a space application is maximized in an office space. Complicated electric wires used for a computer are cleaned, and a good office interior can be obtained.

What is claimed is:

1. A computer including a body part, a monitor, a keyboard and a mouse, the computer attachable to an undersurface of a desk, comprising:
    an engaging member which is protruded from an upper surface of a casing of the body part; and
    a mounting member including a guide rail which is fixed to an undersurface of the desk so that the engaging member slides and is inserted, wherein the body part is detachably engaged to the undersurface of the desk,
    wherein said mounting member has an arc shape bent part on a lower surface of the guide rail, and linearly contacts with the engaging member for thereby minimizing friction,
    wherein a plurality of pressurizing concave portions are formed along the guide rail having the arc shape bent part.

2. The computer of claim 1, wherein said engaging member has a ⊓-shape cross section as it is protruded in a row from both sides of a casing upper surface of the body part, and said mounting member includes a support plate fixed to an undersurface of the desk, and a guide rail having a ⌴-shape cross section downwardly protruded while corresponding to the engaging member in a lower direction of the support plate, so the engaging members slide and are engaged along the guide rail.

3. The computer of claim 1, wherein said body part is equipped with a main heating radiation hole in a. casing lower surface, and a cooling fan and a main board are downwardly mounted in the interior of the same, and the cooling fan blows towards the main heat radiating hole of the casing lower surface for thereby blowing toward the main board based on a downward blowing method.

4. The computer of claim 3, wherein in said body part, an optical disk driver (ODD) is upwardly engaged in the interior of the casing as compared to the cooling fan and the main board which are downwardly engaged.

5. The computer of claim 3, wherein in said body part, a heat radiation hole is formed in a lower surface, both sides, and front and rear sides of the casing, respectively.

* * * * *